US012562829B2

(12) United States Patent
Sakai

(10) Patent No.: US 12,562,829 B2
(45) Date of Patent: Feb. 24, 2026

(54) RADIO WAVE ABNORMALITY DETECTION SYSTEM, RADIO WAVE ABNORMALITY DETECTION METHOD, AND RADIO WAVE ABNORMALITY DETECTION PROGRAM

(71) Applicant: NEC Corporation, Tokyo (JP)

(72) Inventor: Jun Sakai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 325 days.

(21) Appl. No.: 18/181,182

(22) Filed: Mar. 9, 2023

(65) Prior Publication Data

US 2023/0308198 A1 Sep. 28, 2023

(30) Foreign Application Priority Data

Mar. 24, 2022 (JP) ................................. 2022-047808

(51) Int. Cl.
  *H04B 17/391* (2015.01)
  *H04B 17/309* (2015.01)
(52) U.S. Cl.
  CPC ......... *H04B 17/391* (2015.01); *H04B 17/309* (2015.01)
(58) Field of Classification Search
  CPC ............................ H04B 17/391; H04B 17/309
  See application file for complete search history.

(56) References Cited

U.S. PATENT DOCUMENTS

| | | | |
|---|---|---|---|
| 2017/0054612 A1 | 2/2017 | Yi et al. | |
| 2018/0067967 A1* | 3/2018 | Miyahara | ............... G06V 20/53 |
| 2023/0092448 A1 | 3/2023 | Ito et al. | |
| 2023/0161334 A1* | 5/2023 | Sasaki | .................... H04M 11/00 |
| | | | 700/28 |

FOREIGN PATENT DOCUMENTS

| | | |
|---|---|---|
| JP | 5760899 B2 | 8/2015 |
| JP | 2017-041883 A | 2/2017 |
| JP | 2019-122039 A | 7/2019 |
| JP | 2021-100164 A | 7/2021 |
| WO | 2021/176805 A1 | 9/2021 |

OTHER PUBLICATIONS

JP Office Action for JP Application No. 2022-047808, mailed on Nov. 25, 2025 with English Translation.

* cited by examiner

*Primary Examiner* — Natasha W Cosme

(57) ABSTRACT
A radio wave abnormality detection system, a radio wave abnormality detection method, and a radio wave abnormality detection program that are capable of accurately detecting a radio wave abnormality are provided.
The radio wave abnormality detection system includes: a determination unit that determines an extraction period, based on a transmission duration estimated from first received data of a radio wave received at a first timing; a learning unit that generates a learned model in which a feature value extracted in the extraction period from second received data of a radio wave received at a second timing is machine-learned; and a detection unit that detects a radio wave abnormality by using a feature value extracted in the extraction period from third received data of a radio wave received at a third timing, and the learned model.

13 Claims, 12 Drawing Sheets

SAMPLE DATA

S111

SPECTROGRAM CONVERSION

S112

ESTIMATE SIGNAL LEVEL

S113

CALCULATE TRANSMISSION
DURATION

S114

CALCULATE MINIMUM
TRANSMISSION DURATION

DB1

FEATURE VALUE PARAMETER
(EXTRACTION PERIOD OF
FEATURE VALUE)

RECEIVED DATA

SPECTROGRAM CONVERSION          S211

FEATURE VALUE CONVERSION          S212

FEATURE VALUE PARAMETER          DB1

MACHINE-LEARNING          S213

LEARNED MODEL          DB2

SAMPLE DATA

SPECTROGRAM CONVERSION — S111

ESTIMATE SIGNAL LEVEL — S112

CALCULATE TRANSMISSION DURATION — S113

ESTIMATE TRANSMISSION DURATION TYPE — S115

TRANSMISSION DURATION OF NORMAL RADIO IS? — S116

CONSTANT

INDEFINITE

CALCULATE MINIMUM TRANSMISSION DURATION — S114

CALCULATE MAXIMUM TRANSMISSION DURATION — S117

FEATURE VALUE PARAMETER (EXTRACTION PERIOD OF FEATURE VALUE) — DB1

FIRST EXAMPLE IN WHICH TRANSMISSION DURATION IS CONSTANT

SECOND EXAMPLE IN WHICH TRANSMISSION DURATION IS CONSTANT

EXAMPLE IN WHICH TRANSMISSION DURATION IS INDEFINITE

RADIO WAVE ABNORMALITY DETECTION SYSTEM, RADIO WAVE ABNORMALITY DETECTION METHOD, AND RADIO WAVE ABNORMALITY DETECTION PROGRAM

INCORPORATION BY REFERENCE

This application is based upon and claims the benefit of priority from Japanese patent application No. 2022-047808, filed on Mar. 24, 2022, the disclosure of which is incorporated herein in its entirety by reference.

TECHNICAL FIELD

The present disclosure relates to a radio wave abnormality detection system, a radio wave abnormality detection method, and a radio wave abnormality detection program.

BACKGROUND ART

Wireless communication using radio waves is utilized in various fields, and among the fields, communication such as police radio, fire radio, aeronautical radio, and railway radio, which are particularly important, is called important wireless communication. When interference occurs in the important wireless communication, it is likely to expand into a life-threatening situation, and therefore, it is very important to perform, with respect to an emission status of radio waves to be used for the communication, detection (monitoring) of radio wave interference and a failure.

As a radio system that performs these types of wireless communication, there is a system in which a transmission duration is predetermined, such as data communication, and there is also a system in which a transmission duration is different every time according to a content of the communication, such as voice communication.

Generally, when detection of radio wave interference or a failure is performed with respect to an emission status of a radio wave or with respect to a radio system, a method is conceivable in which a threshold value is set for a reception level of a certain radio wave, and a radio wave whose reception level exceeds the threshold value is determined to be abnormal. The threshold value of a reception level determined for each frequency of a radio wave is referred to as a spectrum mask. In this case, only when the reception level exceeds the value of the spectrum mask is determined to be abnormal, and therefore, when the reception level is low or an abnormality occurs in a feature value other than the reception level, there is a problem that it is not determined to be abnormal.

In order to solve such a problem, Japanese Patent No. 5760899 proposes a technique of determining presence or absence of occurrence of radio wave interference and a factor thereof by extracting an amplitude feature value at each predetermined time from sampling data of a received radio wave and calculating similarity between the extracted amplitude feature value and a plurality of pieces of teacher data.

SUMMARY

However, in Japanese Patent No. 5760899, since the amplitude feature value is extracted for each predetermined time, when a ratio of a transmission duration to the predetermined time is different from one another, the amplitude feature value is also different from one another. Therefore, in a related technology such as Japanese Patent No.

5760899, a radio wave abnormality such as radio wave interference may not be accurately detected in some cases.

In view of the above-described problem, an example object of the present disclosure is to provide a radio wave abnormality detection system, a radio wave abnormality detection method, and a radio wave abnormality detection program that are capable of detecting a radio wave abnormality with high accuracy.

In a first example aspect, a radio wave abnormality detection system according to the present disclosure includes: a determination unit configured to determine an extraction period, based on a transmission duration estimated from first received data of a radio wave received at a first timing; a learning unit configured to generate a learned model in which a feature value extracted in the extraction period from second received data of a radio wave received at a second timing is machine-learned; and a detection unit configured to detect a radio wave abnormality by using a feature value extracted in the extraction period from third received data of a radio wave received at a third timing, and the learned model.

In a second example aspect, a radio wave abnormality detection method according to the present disclosure includes: determining an extraction period, based on a transmission duration estimated from first received data of a radio wave received at a first timing; generating a learned model in which a feature value extracted in the extraction period from second received data of a radio wave received at a second timing is machine-learned; and detecting a radio wave abnormality by using a feature value extracted in the extraction period from third received data of a radio wave received at a third timing, and the learned model.

In a third example aspect, a radio wave abnormality detection program according to the present disclosure is a radio wave abnormality detection program for causing a computer to execute processing of: determining an extraction period, based on a transmission duration estimated from first received data of a radio wave received at a first timing; generating a learned model in which a feature value extracted in the extraction period from second received data of a radio wave received at a second timing is machine-learned; and detecting a radio wave abnormality by using a feature value extracted in the extraction period from third received data of a radio wave received at a third timing, and the learned model.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Figure 1:
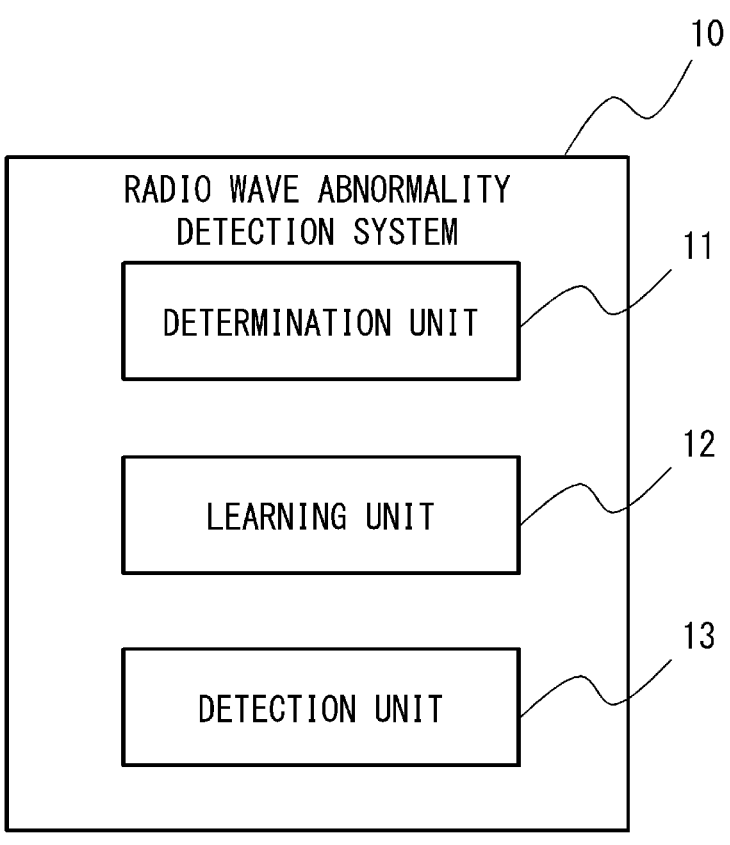
FIG. 1 is a block diagram illustrating an outline of a radio wave abnormality detection system according to an example embodiment.

Hereinafter, example embodiments will be described with reference to the drawings. In the drawings, the same elements are denoted by the same reference signs, and redundant description is omitted as necessary.

[Summary of Invention]

As described above, in Patent Publication No. 5760899, since the amplitude feature value is extracted for each predetermined time, when the ratio of a transmission duration to the predetermined time is different from one another, the amplitude feature value is also different from one another. Therefore, in a radio system having a transmission duration that is different each time, such as voice communication, each communication becomes a different amplitude feature value. Therefore, communication of a transmission duration that does not appear when received data that is to be a basis of teacher data is collected is determined as an interference wave. This is a problem that occurs when the predetermined time set when the amplitude feature value is calculated is larger than the transmission duration.

As a means for avoiding this problem, a method is conceivable in which a predetermined time when the amplitude feature value is calculated is set sufficiently small, and a normal radio is set so as to be transmitted at all times during the predetermined time. However, if the time length is too short, not only the normal radio but also all the interference waves are constantly detected for a predetermined time, and the difference between the time characteristics of the normal radio and the interference waves is not expressed in the feature value. The purpose of the anomaly detection system is to separate the normal radio and the interference wave, and it is desirable to combine as many characteristics as possible, such as intensity, frequency, and time, as the means.

Therefore, in an example embodiment, even when a transmission duration of a regular radio system is different each time, a characteristic of regular radio and a characteristic an interference wave are compared including a difference in time characteristics, and thereby detection of a radio wave abnormality due to the interference wave is enabled.

FIG. 1 illustrates an outline of a radio wave abnormality detection system according to the example embodiment. As illustrated in FIG. 1, a radio wave abnormality detection system 10 according to the example embodiment includes a determination unit 11, a learning unit 12, and a detection unit 13. Note that the radio wave abnormality detection system 10 may be configured of one device or may be configured of a plurality of devices.

The determination unit 11 determines an extraction period, based on a transmission duration estimated from first received data of a radio wave received at a first timing. In one example, the determination unit 11 may determine the extraction period, based on a minimum transmission duration estimated from the first reception data. In another example, the determination unit 11 may determine the extraction period, based on a maximum transmission duration estimated from the first reception data. Further, the determination unit 11 may estimate a type of the transmission duration and may determine the extraction period from the minimum transmission duration or the maximum transmission duration, according to the estimated type.

The learning unit 12 generates a learned model in which a feature value extracted in the extraction period from a second received data of a radio wave received at a second timing (a timing after the first timing) is machine-learned. The detection unit 13 detects a radio wave abnormality by using a feature value extracted in the extraction period from a third received data of a radio wave received at a third timing (a timing after the second timing), and the learned model.

As described above, in the example embodiment, the extraction period for extracting the feature value used for generating the learned model and detecting the radio wave abnormality is determined based on the transmission duration estimated from the received data. As a result, the extraction period of feature value can be appropriately determined, and thus the radio wave abnormality can be accurately detected.

In the example embodiment, for example, the extraction period is determined based on the minimum transmission duration estimated from the received data, or the extraction period is determined based on the type of the estimated transmission duration. Thus, even when the transmission duration of the regular radio system is not constant, it is possible to detect an interference wave by comparing the characteristics of the regular radio and the interference wave, including the difference in the time characteristics, without being affected by fluctuation of the transmission duration of the regular radio system.

First Example Embodiment

Figure 2:
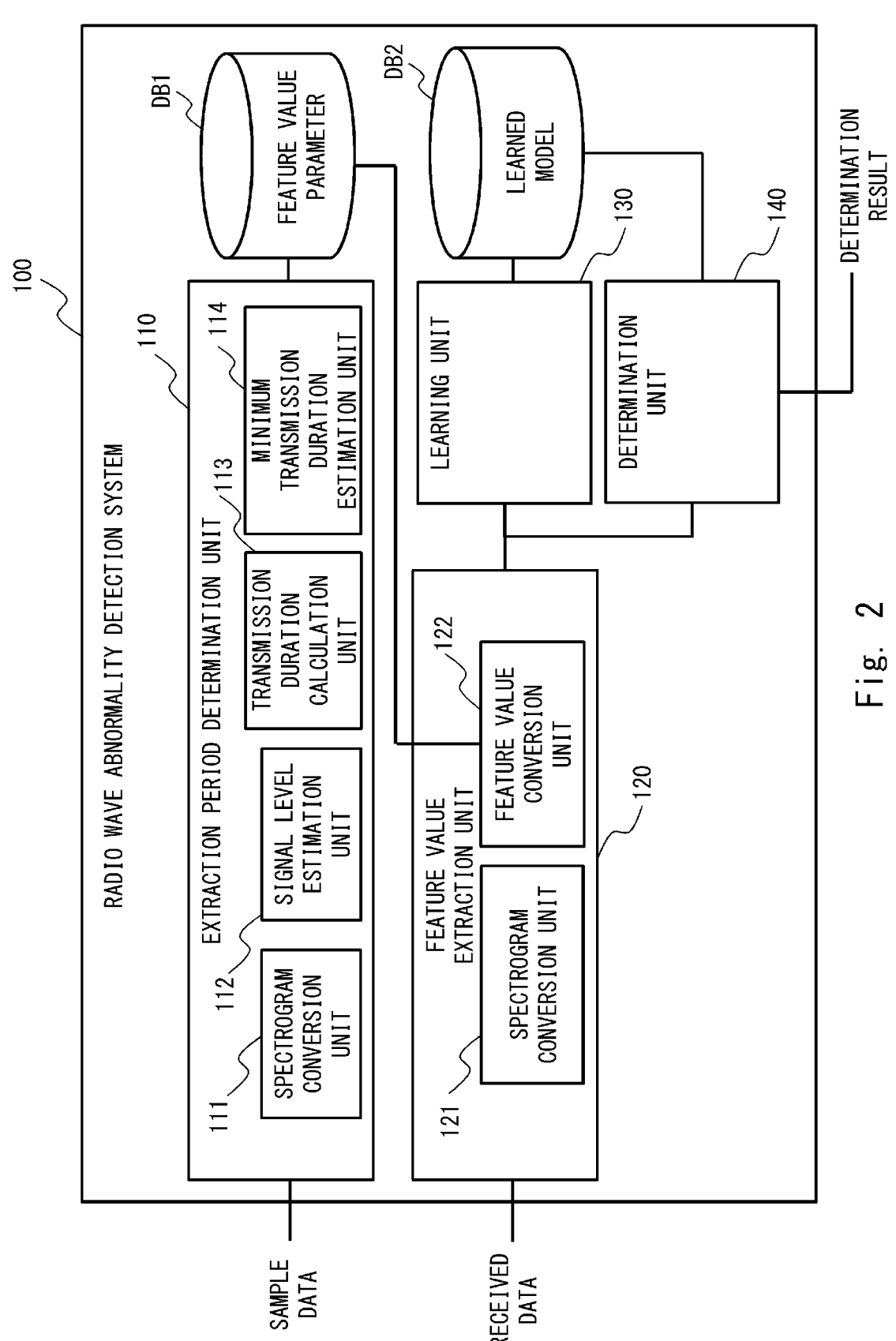
FIG. 2 is a block diagram illustrating an example of an overall configuration of a radio wave abnormality detection system according to a first example embodiment.

Next, a configuration of a radiowave abnormality detection system according to a first example embodiment will be described. FIG. 2 is a block diagram illustrating an example of an overall configuration of the radio wave abnormality detection system according to the first example embodiment.

As illustrated in FIG. 2, a radio wave abnormality detection system 100 according to the present example embodiment includes an extraction period determination unit 110, a feature value extraction unit 120, a learning unit 130, a determination unit 140, and databases DB1, and DB2. A receiver (not illustrated) for receiving a radio wave is provided inside or outside the radio wave abnormality detection system 100, and received data (sample data) are input from the receiver to the extraction period determination unit 110 and the feature value extraction unit 120.

The extraction period determination unit 110 determines an extraction period for the feature amount extraction unit 120 to extract a feature value, based on sample data (received data) acquired before learning processing and determination processing (a first timing). For example, extraction period determination unit 110 determines the extraction period, based on a transmission duration estimated from the received data (first received data) of a first radio wave (extraction period determination radio wave) received at the first timing, and in particular, determines the extraction period, based on a minimum transmission duration estimated from the received data. The estimated transmission duration is a transmission duration in normal (regular) radio at normal time.

The extraction period determination unit 110 includes a spectrogram conversion unit 111, a signal level estimation unit 112, a transmission duration calculation unit 113, and a minimum transmission duration estimation unit 114. The spectrogram conversion unit 111 calculates a spectrum or a spectrogram from the sample data (received data). The signal level estimation unit 112 estimates, by using the calculated spectrum or spectrogram, a signal level of a transmission signal included in the received data, among a value of noise floor inside the receiver measured at a time when a signal included in a normal received data is not transmitted and a received power intensity (signal level) of a signal measured at a time when the signal is transmitted.

The transmission duration calculation unit 113 calculates a time (transmission duration) during which the signal level of each signal estimated by the signal level estimation unit 112 is continuously transmitted. The minimum transmission duration estimation unit 114 estimates a minimum transmission duration from data of the transmission durations of a plurality of the signals calculated by the transmission duration calculation unit 113. Then, the minimum transmission duration estimation unit 114 determines, based on the minimum transmission duration, a predetermined time length for calculating a feature value, which is described later, and outputs the determined time length (extraction period) as a feature value parameter.

The database DB1 is a feature value parameter storage unit that stores, as a feature value parameter, the calculation time (extraction period) of the feature value output by the extraction period determination unit 110.

The feature value extraction unit 120 extracts a feature value from received data (second received data) of a second radio wave (learning radio wave) received during the learning processing (second timing), in the extraction period determined by the extraction period determination unit 110, and extracts a feature value from received data (third received data) of a third radio wave (monitoring target radio wave) received during the determination processing (third timing), in the extraction period determined by the extraction period determination unit 110.

The feature extraction unit 120 includes a spectrogram conversion unit 121 and a feature value conversion unit 122. The spectrogram calculation unit 121 calculates a spectrum or a spectrogram from the received data. The feature value extraction unit 122 extracts, by using the calculated spectrum or spectrogram, a feature value of the received data, in the extraction period stored in the database DB1.

At a time of learning processing, the learning unit 130 performs machine learning of a model (learned model) indicating whether or not a radio wave abnormality (radio wave interference, a failure, and the like) is included in the received data, by using the feature value extracted by the feature value extraction unit 120 from a sample of the received data. Specifically, the learning unit 130 generates a learned model in which the feature value extracted in the extraction period from the received data of the second radio wave is machine-learned. The database DB2 is a learned model storage (memory) unit that stores the learned model generated by the learning unit 130 through machine learning.

At a time of the determination processing, the determination unit 140 determines whether abnormal radio (radio wave abnormality) is included in the received data, by using the feature value output from the received data by the feature value extraction unit 120, and the learned model, and outputs a determination result. Specifically, the determination unit (detection unit) 140 detects a radio wave abnormality by using a feature value extracted in the extraction period from the received data of the third radio wave, and the learned model.

Note that, the time of the learning processing is a process of performing machine learning of a model indicating whether a radio wave abnormality is included in actual received data, which is performed after a normal state is learned by using sample data in advance. The time of the determination processing is a process of determining, by using actual received data, whether a radio wave abnormality is included in the received data.

Further, the feature value extracted from the received data is statistical information including information of both a frequency direction and a time direction of the received data in a predetermined extraction period. For example, the feature value is assumed to be a statistical feature value extracted for each predetermined time period, such as a frequency distribution (histogram), a probability-density function (PDF), a cumulative distribution function (CDF), and an amplitude-probability distribution (APD). The feature value may be directly extracted from the received data on a time axis, or the received data may be converted into data on a frequency axis by spectrum conversion or spectrogram conversion, and the feature amount may be extracted for each frequency.

Figure 3:
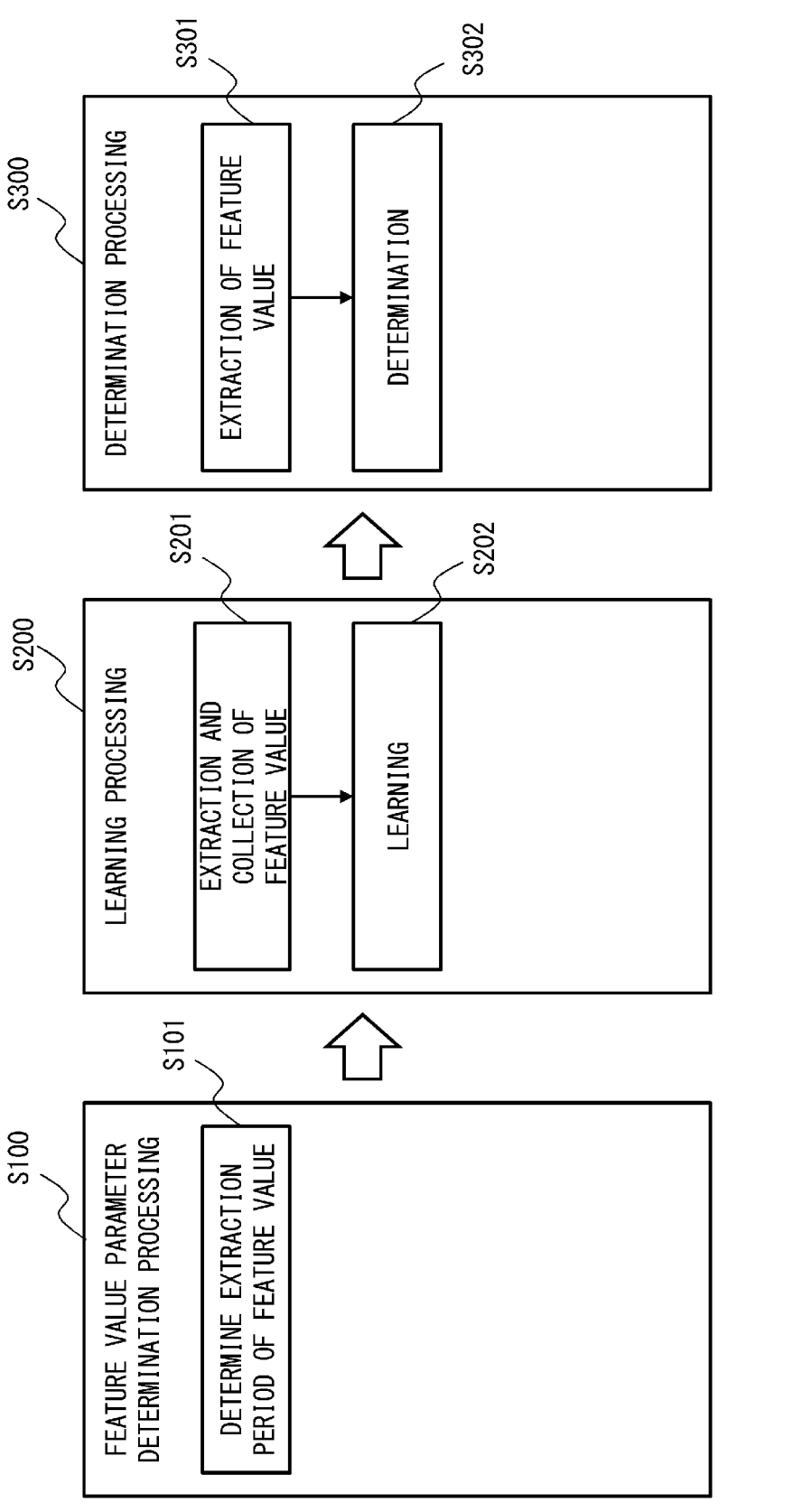
FIG. 3 is a flowchart illustrating an outline of an overall processing flow of the radio wave abnormality detection system according to the first example embodiment.

Next, an operation (radio wave abnormality detection method) of the radio wave abnormality detection system according to the first example embodiment will be described. FIG. 3 is a flowchart illustrating an outline of an overall processing flow of the radio wave abnormality detection system 100 according to the present example embodiment.

As illustrated in FIG. 3, the processing by the radio wave abnormality detection system 100 includes steps of feature value parameter determination processing (S100), learning processing (S200), and determination processing (S300). The radio wave abnormality detection system 100 performs the feature value parameter determination processing (S100) and the learning processing (S200) in advance or periodically, and sequentially performs the determination processing (S300) at a time of operation. For example, the received data of the first radio wave (for extraction period determination) and the received data of the second radio wave (learning radio wave) are the received data of the radio wave received in advance or at regular timing (first and second timings), and the received data of the third radio wave (monitoring target radio wave) is the received data of the radio wave received at sequential timing (third timing) at the time of operation.

In the feature value parameter determination processing (S100), the extraction period determination unit 110 determines a time length (extraction period) for extracting a feature value (S101). In the learning processing (S200), the feature value extraction unit 120 collects feature values extracted from a large number of pieces sample data, based on the predetermined period (extraction period) (S201), and the learning unit 130 generates a learned model for classifying a normal state and an abnormal state through machine learning (S202). Then, in the determination processing (S300), the feature value extraction unit 120 extracts a feature value from data received at a time of operation (S301), and the determination unit 140 determines, by using the learned model generated in the learning processing (S200), whether or not a radio wave abnormality is included in the received data (S302).

It is assumed that the feature value parameter determination processing (S100) and the learning processing (S200) are performed by collecting, as sample data, the received data in the normal state in which abnormal radio is not transmitted. Since a collection period of the received data (sample data) used for the learning is sufficient as long as a communication condition assumed in the normal state (normal time) is generally included, there is no problem even when the received data are data of several seconds to several tens of seconds in any one day, or data of several tens of seconds or several hours in total, extracted at random or at regular intervals over several days or one week.

Figure 4:
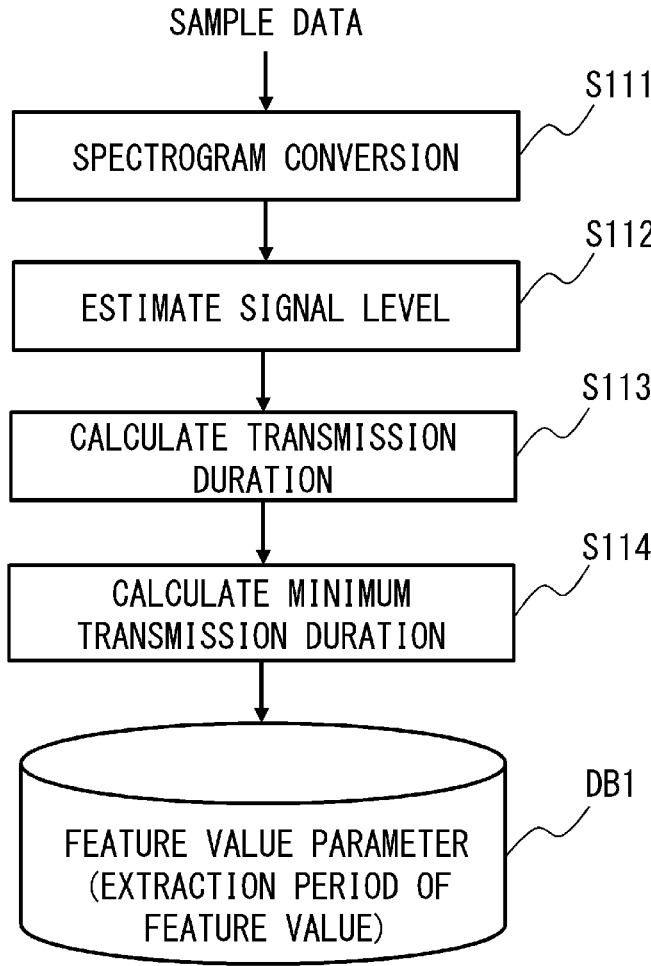
FIG. 4 is a flowchart illustrating a specific example of feature value parameter determination processing according to the first example embodiment.

FIG. 4 is a flowchart illustrating a specific example of the feature value parameter determination processing (S100) according to the present example embodiment illustrated in FIG. 3. FIG. 5A to FIG. 5D are diagrams for explaining steps of the feature value parameter determination processing in FIG. 4.

Figure 5A:
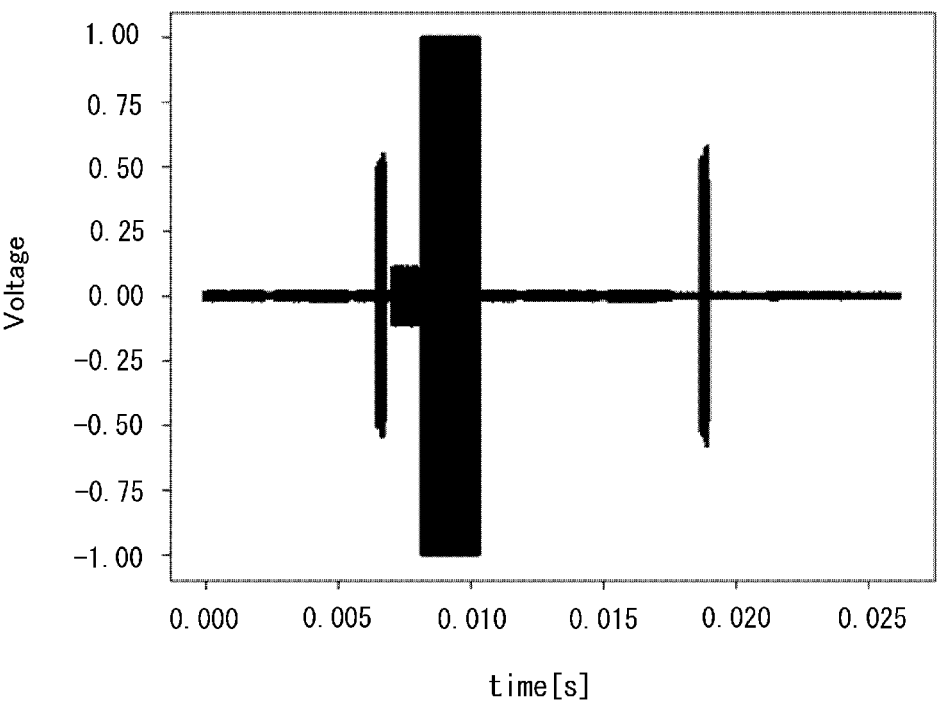
FIG. 5A is a diagram for explaining a step of the feature value parameter determination processing according to the first example embodiment.
Figure 5B:
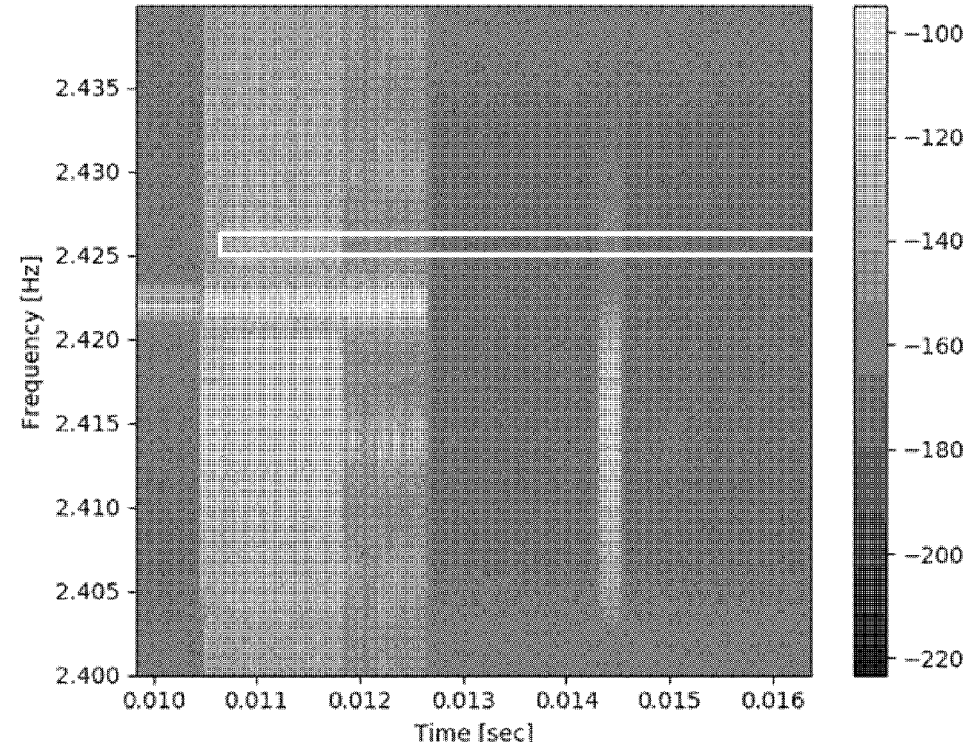
FIG. 5B is a diagram for explaining a step of the feature value parameter determination processing according to the first example embodiment.

As illustrated in FIG. 4, first, in spectrogram conversion step (S111), the spectrogram conversion unit 111 performs spectrum conversion or spectrogram conversion on the received data collected for extraction period determination or learning, and converts the received data into data indicating a reception level for each time or frequency. FIG. 5A illustrates an example of the acquired received data (sample data). In the example in FIG. 5A, the received data are time-series data of the received power, but the received data are not limited thereto. FIG. 5B illustrates an example of data obtained by converting the received data into a spectrogram. In the example in FIG. 5B, a horizontal axis indicates time, a vertical axis indicates frequency, and a color or brightness at each time and frequency indicates a signal level.

Figure 5C:
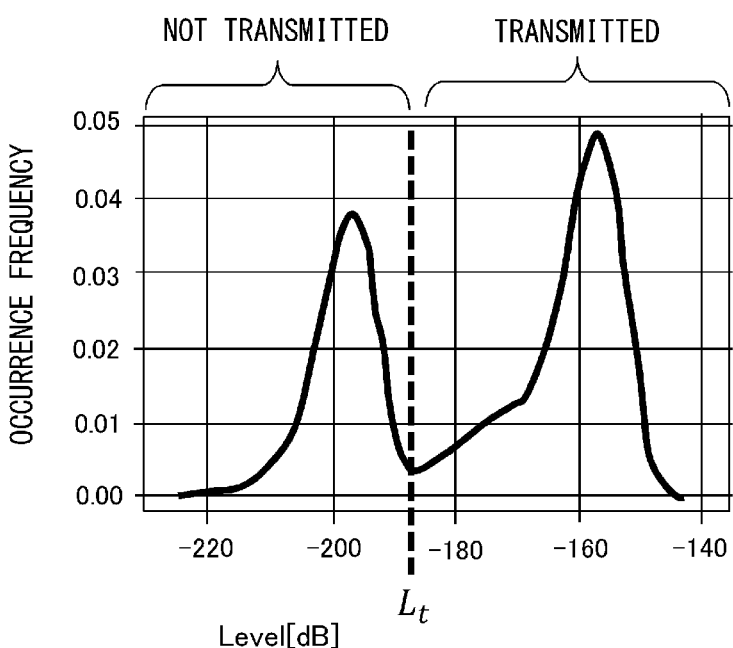
FIG. 5C is a diagram for explaining a step of the feature value parameter determination processing according to the first example embodiment.

Next, in a signal level estimation step (S112), as illustrated in FIG. 5C, the signal level estimation unit 112 first generates a histogram of received power in which a horizontal axis represents received power and a vertical axis represents frequency for each frequency bin of the spectrogram. When both a time period in which a radio wave is transmitted and a time period in which no radio wave is transmitted are included in a target frequency, a peak relevant to each of the time periods appears in the histogram.

A peak having a small intensity is measurement data in the time period in which no radio wave is transmitted, and usually corresponds to a noise floor caused by internal noise of the receiver. A peak having a large intensity indicates a received power of a signal observed in this frequency band.

Then, in order to identify the time period in which the radio wave is transmitted, the signal level estimation unit 112 calculates a reception level Lt whose occurrence frequency is a first minimum point in the histogram of the received power, with a peak having a smallest intensity corresponding to the noise floor being a starting point. Lt is referred to as a signal presence/absence determination threshold value, and when a received power larger than Lt is observed, it is assumed that some radio wave is transmitted. Specifically, the signal presence/absence determination threshold value is a received power whose occurrence frequency becomes the first minimum point in the histogram indicating the occurrence frequency of each received power, starting from the received power corresponding to the noise floor of the receiver that receives the radio wave.

Next, in a transmission duration calculation step(S113), the transmission duration calculation unit 113 first calculates, as a transmission duration, a time length (duration) in which the received power larger than the signal presence/absence determination threshold value Lt is obtained. This processing is performed on all the obtained sample data for each frequency bin of the spectrogram. Then, as illustrated in FIG. 5D, the transmission duration calculation unit 113 generates a histogram of the transmission duration for each frequency bin.

Figure 5D:
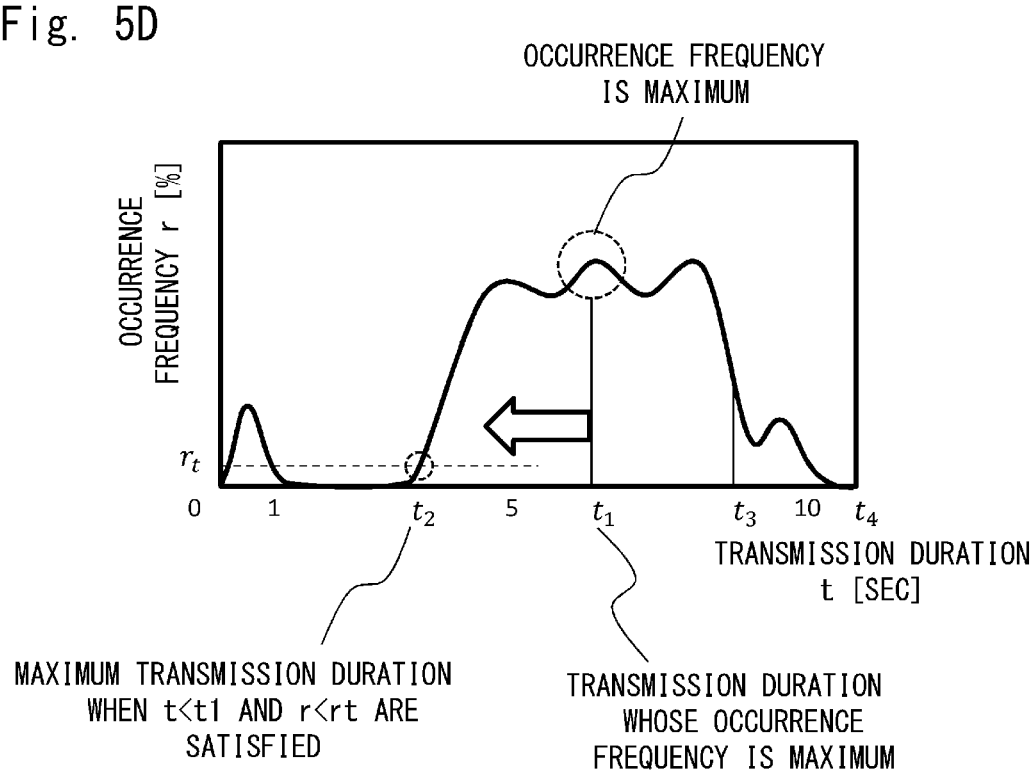
FIG. 5D is a diagram for explaining a step of the feature value parameter determination processing according to the first example embodiment.

Next, in a minimum transmission duration calculation step (S114), the minimum transmission duration estimation unit 114 first sets a threshold value $r_t$ of an occurrence frequency r, as illustrated in FIG. 5D, and it is regarded that communication whose transmission duration in which the occurrence frequency r becomes $r<r_t$ hardly occurs in the normal signal. Next, the minimum transmission duration estimation unit 114 calculates a maximum occurrence frequency in the histogram of the transmission duration, and acquires a transmission duration $t_1$ corresponding the maximum occurrence frequency. Then, a maximum transmission duration $t_2$ in which $r<r_t$ is obtained when $t<t_1$ is satisfies. This $t_2$ is used as a minimum transmit duration in the sample data.

In the example in FIG. 5D, a signal satisfying $r>r_t$ is observed even in a range of t<one second, however, a signal for such a short period of time may be caused by noise contamination, erroneous operation of a radio call, transmission cancellation, or the like, and it is desirable to exclude such a signal. Therefore, by calculating the minimum transmission duration by the above-described method, it is possible to calculate the minimum transmission duration of regular wireless communication. Specifically, the minimum transmission duration is a transmission duration that is shorter than a transmission duration whose occurrence frequency becomes maximum in the histogram indicating occurrence frequency of each transmission duration, and is a maximum transmission duration among transmission durations whose occurrence frequency is smaller than the predetermined occurrence frequency threshold value.

Finally, the minimum transmission duration estimation unit 114 determines an extraction period of feature value, based on the minimum transmission duration $t_2$. As the extraction period, the $t_2$ may be used without change, or a numerical value close to the $t_2$ may be used. For example, the extraction period may be a delimited value close to the $t_2$. The minimum transmission duration estimation unit 114 stores the determined extraction period of feature value in the database DB1.

Figure 6:
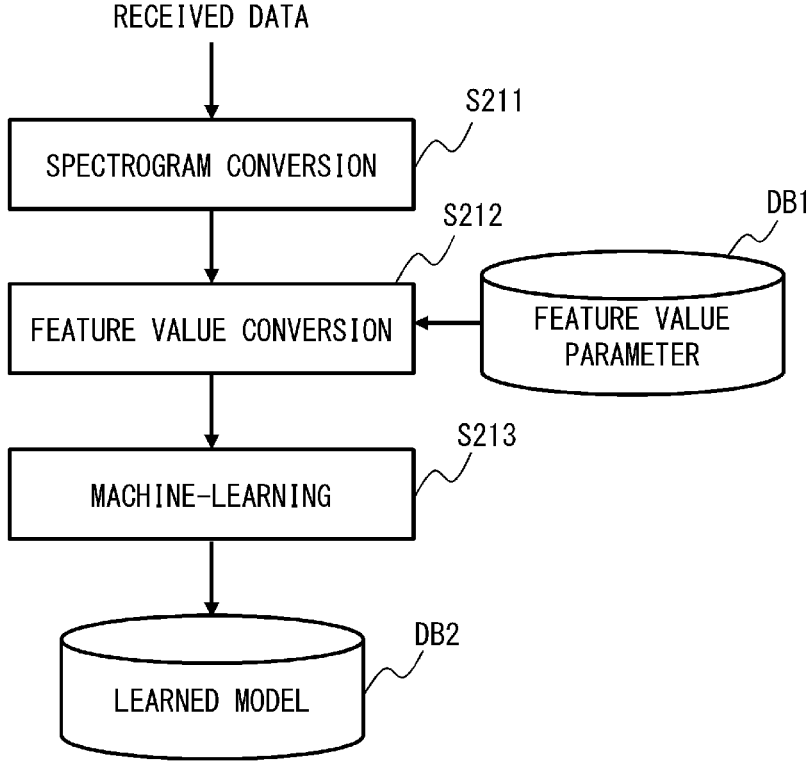
FIG. 6 is a flowchart illustrating a specific example of learning processing according to the first example embodiment.

FIG. 6 is a flowchart illustrating a specific example of the learning processing (S200) according to the present example embodiment illustrated in FIG. 3. As illustrated in FIG. 6, first, the spectrogram conversion unit 121 performs spectrum conversion or spectrogram conversion on received data collected for learning, as in the feature value parameter determination processing, and converts the received data into data indicating a reception level for each time or for each frequency (S211).

Next, the feature value conversion unit 122 refers to the database DB1, divides the spectrogram for each extraction period of feature value determined in the step of the feature value parameter determination processing (S114), and converts each divided piece of the spectrogram into a feature value (S212).

Next, the learning unit 130 generates a learned model for classifying a normal state and an abnormal state through machine learning, by using the feature value extracted and collected by the feature value conversion unit 122 (S213). Then, the learning unit 130 stores the learned model generated through machine learning in the database DB2.

As the machine-learning, methods such as one-class support vector machine (one-class SVM), Hotelling theory, local outlier factor (LOF) method, and k-nearest neighbor method can be used. In addition, the machine learning may be machine learning of a model such as an anomaly detection model using deep learning (deep anomaly detection). Alternatively, there is no problem when a method of learning, from distribution of high-dimensional (multi-dimensional) feature value vectors as described above, a threshold value for statistically detecting abnormality by using a Mahalanobis distance, a variance (standard deviation), or the like, or a method of predicting a change tendency by using a state filter such as a Kalman filter or a particle filter and detecting whether or the change tendency is deviated is used as the machine learning adopted by the learning unit 130.

Figure 7:
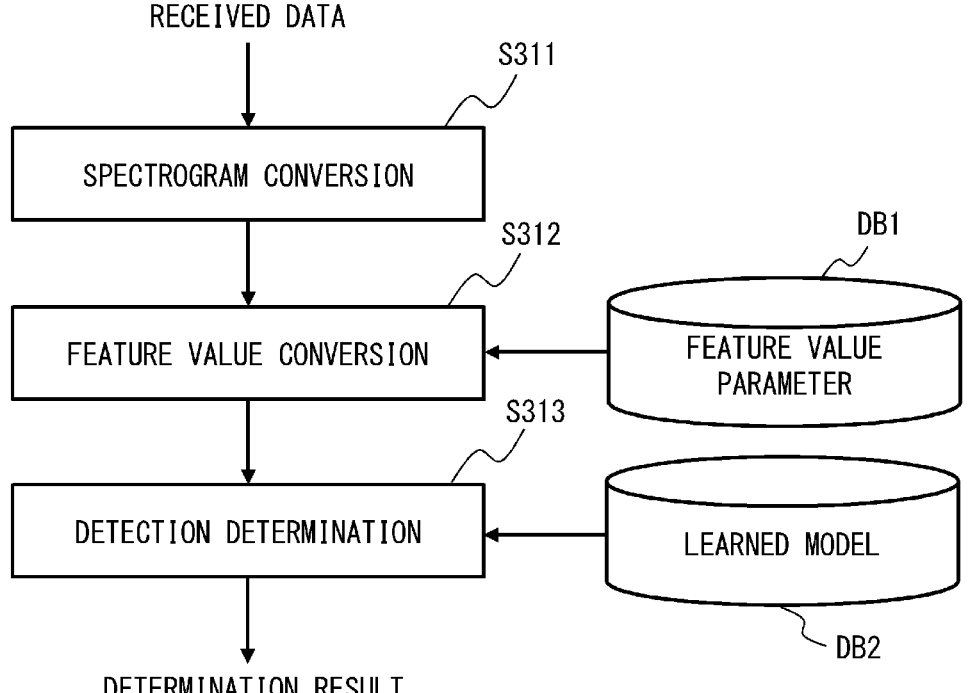
FIG. 7 is a flowchart illustrating a specific example of determination processing according to the first example embodiment.

FIG. 7 is a flowchart illustrating a specific example of the determination processing (S300) according to the present example embodiment illustrated in FIG. 3. This determination processing is processing of acquiring, at a time of actual operation, received data from a radio wave environment to be monitored and sequentially performing detection and determination of radio wave interference and a failure.

As illustrated in FIG. 7, first, similarly to the learning processing, the spectrogram conversion unit 121 performs spectrum conversion or spectrogram conversion on collected received data, and converts the received data into data indicating a reception level for each time or each frequency (S311).

Next, similarly to the learning processing, the feature value conversion unit 122 refers to the database DB1, divides the spectrogram for each extraction period of feature value determined in the step of the feature value parameter determination processing (S114), and converts each divided piece of the spectrogram into a feature value (S312).

Next, the determination unit 140 refers to the database DB2 and determines, by using the learned model generated in the step of the learning processing (S213), whether the feature value extracted by the feature value conversion unit 122 is normal or abnormal (S313).

When the learned model is generated through machine learning such as one-class SVM, which is a type of unsupervised learning, a positional relation and a distance of a vector of the feature value with respect to a discrimination boundary formed in the learned model are converted into a degree of normality (or degree of abnormality) and outputted. Then, the determination unit 140 outputs a determination result as to whether a radio wave abnormality is included in the received data, based on the conversion result.

As described above, by setting the extraction period of feature value to be shorter than the transmission duration of the normal radio, fluctuation in the transmission duration of the normal radio is not reflected in the feature value. Here, when the extraction period of feature value is set to be longer than the transmission duration of the normal radio, for example, when the extraction period is set to be $t_3$ in the histogram of transmission duration in FIG. 5D, a change in the transmission duration of the normal radio is reflected in the feature value. For example, in a case of a radio system in which transmission duration is different every time and a characteristic of a speaker appears, such as an aeronautical radio voice call, it is difficult to collect all samples of the transmission duration of the normal radio that may occur during learning. When the learning samples are insufficient, a signal whose transmission duration has not been learned may be determined to be abnormal, even when it is a regular radio system. Therefore, by setting the extraction period of feature value to be shorter than the transmission duration of the regular radio system, in the feature value, the radio in the normal state is transmitted over the entire extraction period, and it is possible to avoid being affected by the fluctuation in the transmission duration of the normal radio.

Meanwhile, when the extraction period of feature value is set to be too short, an abnormal signal is also detected over the entire extraction period, and a normal signal and an abnormal signal cannot be classified according to the transmission duration. Therefore, it is desirable to set the extraction period of feature value as long as possible while maintaining a condition that the extraction period of feature value is shorter than the transmission duration of the normal radio. In the radio wave abnormality detection system according to the present example embodiment, the extraction period of feature value can be set to be shorter than the transmission duration of the normal radio, and can be set in such a way that an abnormal signal whose transmission duration is shorter than the transmission duration of the normal radio can be detected.

Second Example Embodiment

Next, a configuration of a radio wave abnormality detection system according to a second example embodiment will be described. The radio wave abnormality detection system according to the present example embodiment has a function of observing a normal radio in a target frequency band and determining whether it is effective to apply the radio wave abnormality detection system according to the first example embodiment.

Figure 8:
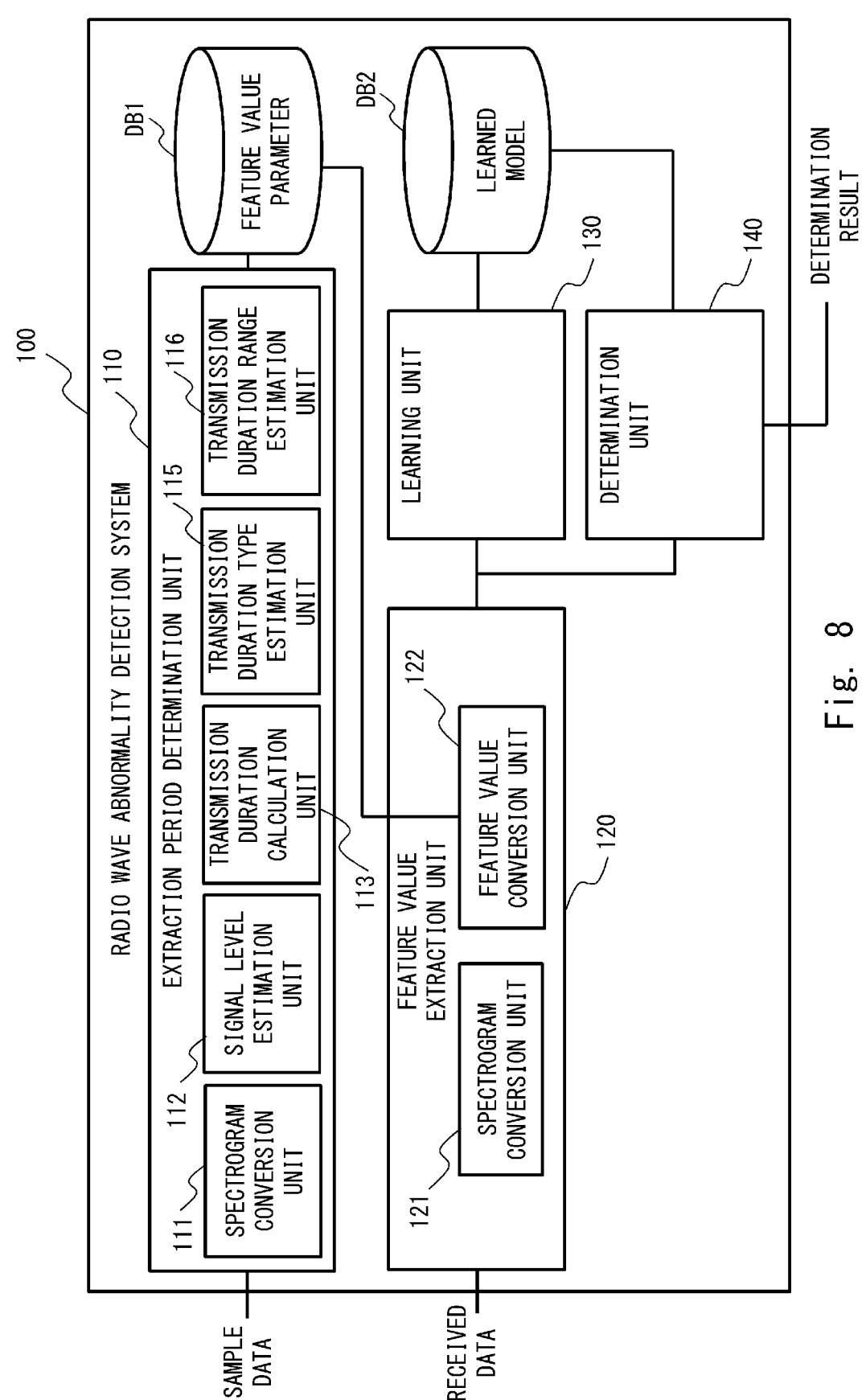
FIG. 8 is a block diagram illustrating an example of an overall configuration of a radio wave abnormality detection system according to a second example embodiment.

FIG. 8 is a block diagram illustrating an example of an overall configuration of the radio wave abnormality detection system according to the present example embodiment. A radio wave abnormality detection system 100 according to the present example embodiment differs from the overall configuration of the first example embodiment illustrated in FIG. 2 in a point that a transmission duration type estimation unit 115 is provided in an extraction period determination unit 110, and a transmission duration range estimation unit 116 is provided instead of the minimum transmission duration estimation unit 114. A configuration and a function of other parts are the same as those of the radio wave abnormality detection system of the first example embodiment.

The transmission duration type estimation unit 115 estimates a type of a transmission duration calculated by the transmission duration calculation unit 113. The transmission duration range estimation unit 116 estimates a range (extraction period) of the transmission duration, based on the type of the transmission duration estimated by the transmission duration type estimation unit 115. For example, when the estimated type is a type indicating a constant transmission duration, the transmission duration range estimation unit 116 determines an extraction period, based on a minimum transmission duration, and when the estimated type is a type indicating an inconstant transmission duration, the transmission duration range estimation unit 116 determines an extraction period, based on a maximum transmission duration.

Figure 9:
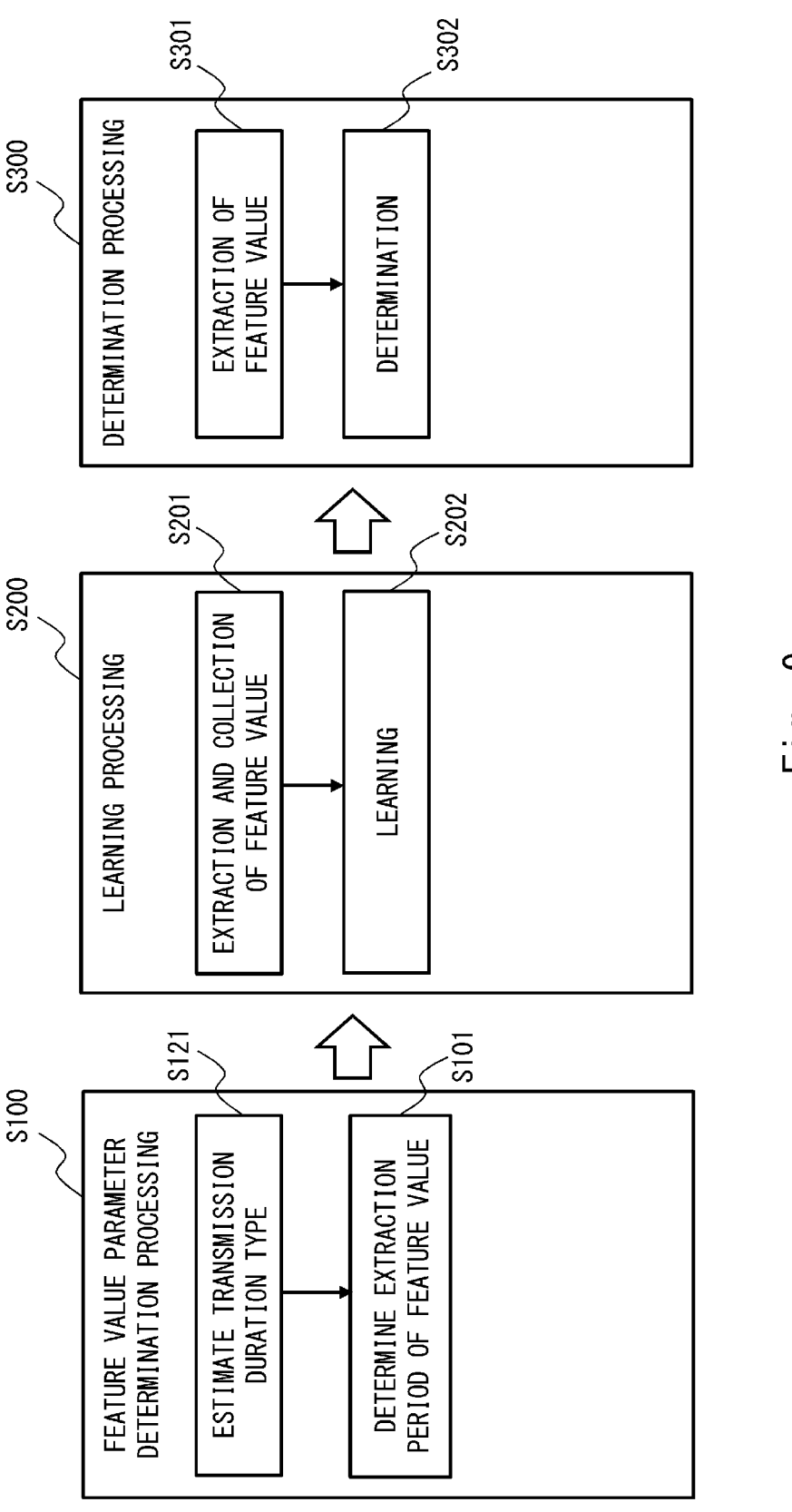
FIG. 9 is a flowchart illustrating an outline of an overall processing flow of the radio wave abnormality detection system according to the second example embodiment.

FIG. 9 is a flowchart illustrating an outline of an overall processing flow of the radio wave abnormality detection system according to the present example embodiment. As illustrated in FIG. 9, processing by the radio wave abnormality detection system 100 includes steps of feature value parameter determination processing (S100), learning processing (S200), and a determination processing (S300), similar to the radio wave abnormality detection system according to the first example embodiment.

In the step of the feature value parameter determination processing (S100), the extraction period determination unit 110 analyzes a trend of a transmission duration of normal radio in a target frequency band, and estimates whether there is a law for the transmission duration (type of the transmission duration) (S121). Then, an extraction period of feature value is determined based on a result of the estimation (S101). The steps of the learning processing (S200) and the determination processing (S300) are similar to those in the first example embodiment.

Figure 10:
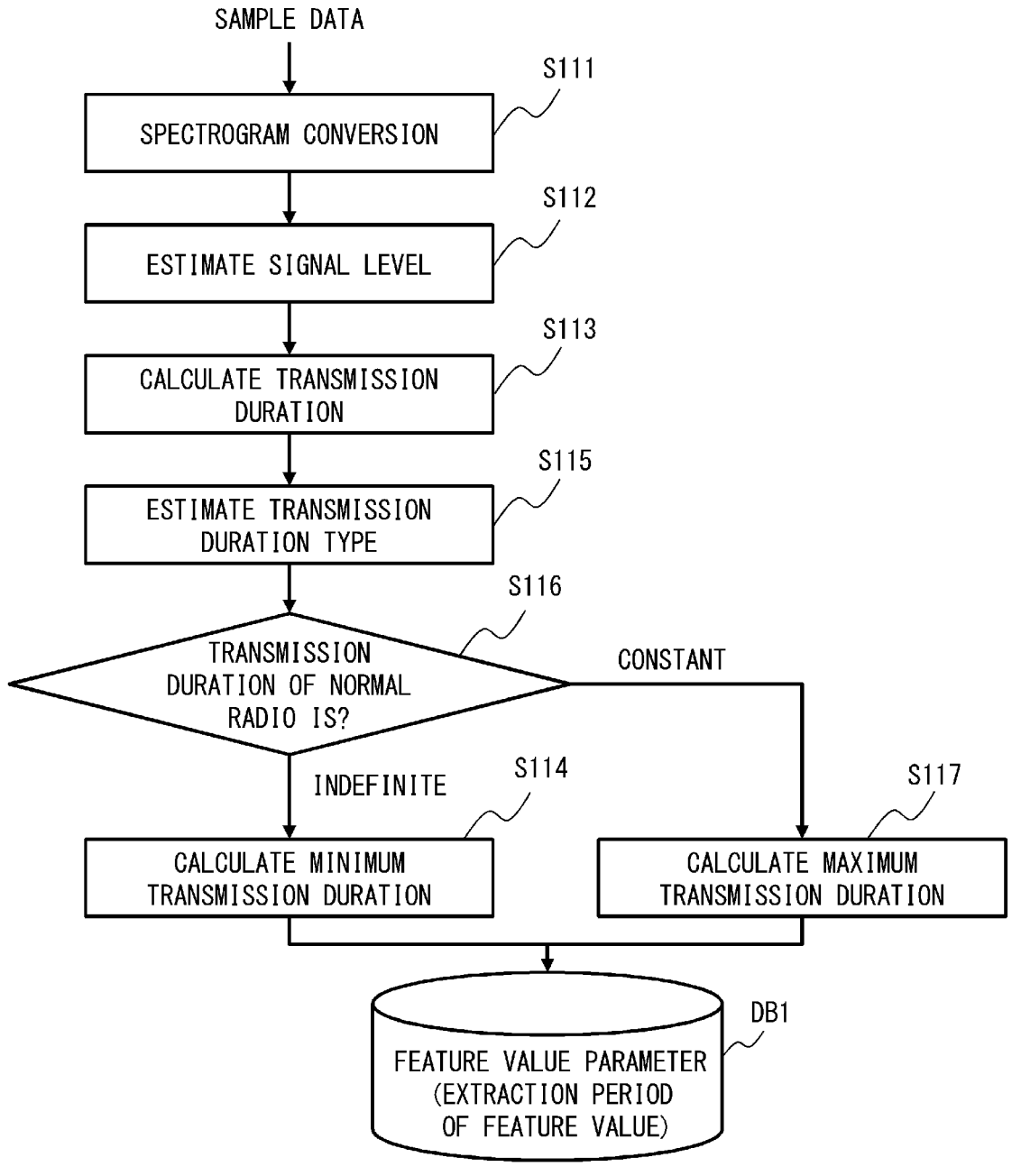
FIG. 10 is a flowchart illustrating a specific example of feature value parameter determination processing according to the second example embodiment.
Figure 11A:
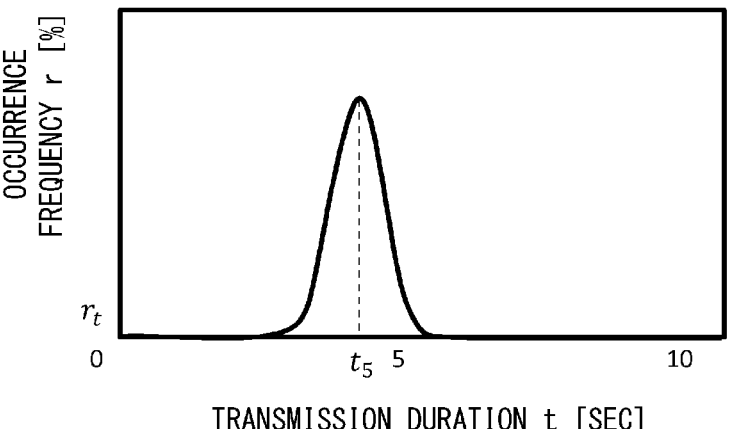
FIG. 11A is a diagram for explaining a step of the feature value parameter determination processing according to the second example embodiment.
Figure 11B:
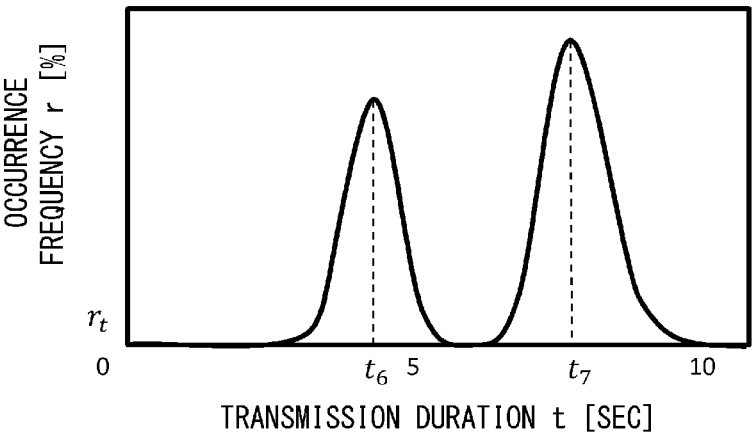
FIG. 11B is a diagram for explaining a step of the feature value parameter determination processing according to the second example embodiment.
Figure 11C:
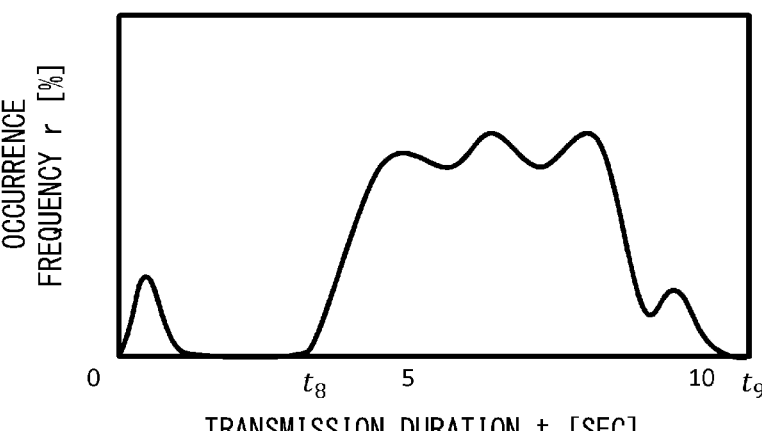
FIG. 11C is a diagram for explaining a step of the feature value parameter determination processing according to the second example embodiment.

FIG. 10 is a flowchart illustrating a specific example of the feature value parameter determination processing (S100) according to the present example embodiment illustrated in FIG. 9. FIGS. 11A to 11C are diagrams for describing transmission duration type estimation processing (S115) in the feature value parameter determination processing in FIG. 10.

First, in a spectrogram conversion step (S111), similarly to that in the radio wave abnormality detection system according to the first example embodiment, a spectrogram conversion unit 111 performs spectrum conversion or spectrogram conversion on received data collected for extraction period determination or learning, and converts the received data into data indicating a reception level for each time or frequency.

Next, in a signal level estimation step (S112), similar to that in the radio wave abnormality detection system according to the first example embodiment, a signal level estimation unit 112 estimates, for each frequency bin of the spectrogram, a received power level of a received signal to be observed.

Next, in a transmission duration calculation step (S113), similarly to that in the radio wave abnormality detection system according to the first example embodiment, the transmission duration calculation unit 113 calculates, for each frequency bin of the spectrogram, as a transmission duration, a time length of all sample data in which the received power larger than a signal presence/absence determination threshold value Lt is obtained, and generates a histogram of the transmission duration.

Next, in the transmission duration type estimation step (S115), the transmission duration type estimation unit 115 estimates a type of the transmission duration of the normal radio in the target frequency band. In the present example embodiment, the transmission duration types are classified into two types: "constant" and "indefinite". Further, it is determined whether a type of the transmission duration of the normal radio is "constant" or "indefinite" (S116).

In a radio system with a constant transmission duration, it is assumed that a transmission duration is distributed around a specific value, and a histogram of the transmission duration is fitted with a preset function, and when a correlation coefficient (correlation value) becomes equal to or larger than a preset threshold value (when the distribution of the transmission duration and the predetermined function are correlated), it is determined that the transmission duration is constant. As an example of the "preset function", a normal distribution, a lognormal distribution, a Rayleigh distribution, or the like can be selected. Regarding the threshold value of the correlation coefficient, the correlation coefficient takes a value between $-1$ and 1, and the closer the correlation coefficient is to 1, the stronger it is indicated that correlation between a measured value of transmission duration and the preset function. Therefore, when a threshold value of the calculated correlation coefficient is set to, for example, 0.8 and the calculated correlation coefficient is 0.8 or more, it is estimated that a transmission duration of normal radio in a target frequency band is constant.

FIG. 11A illustrates one example of a histogram when the transmission duration is constant, and in this frequency band, the transmission duration of the normal radio is distributed around one value $t_5$. In this case, it is presumed that a transmission duration of a system using this frequency band is specified to be $t_5$. FIG. 11B illustrates another example of the histogram when the transmission duration is constant, and the transmission duration of the normal radio is distributed around two values $t_6$ and $t_7$ in this frequency band. In this case, although two radio systems use the same frequency band and transmission durations of the radio systems are different, the transmission duration of the normal radio can also be regarded as constant in this example.

When the transmission duration of the normal radio is designed to take a constant value as in these cases, setting the extraction period of feature value to a value longer than the transmission durations $t_5$, $t_6$, and $t_7$ makes it easier to detect an interference wave by taking advantage of a difference in a time characteristic between the normal radio and the interference wave.

On the other hand, when the correlation coefficient (correlation value) between the histogram of the measured value of the transmission duration and the set function is smaller than the threshold value, it is estimated that the transmission duration of the normal radio in the target frequency band is indefinite. FIG. 11C illustrates an example of a histogram in a case in which the transmission duration is indefinite, and the histogram of the transmission duration has a distribution clearly different from a normal distribution, and the correlation coefficient is small.

In this case, since it can be presumed that the normal radio is not specified in such a way that the transmission duration takes a certain value, if the extraction period of feature value is set to be longer than the transmission duration of the normal radio, for example, $t_9$ in FIG. 11C, a transmission duration that is not extracted at a time of learning may be detected at a time of the determination processing, and in that case, it is erroneously determined to be abnormal. On the other hand, when the extraction period of feature value is set to be shorter than the transmission duration of the normal radio, for example, $t_8$ in the FIG. 11C, fluctuation of the transmission duration of the normal radio is not reflected in the feature value, and therefore it is possible to avoid erroneously determining the normal radio as abnormal. At the same time, by making the extraction period of feature value as long as possible within a range shorter than the transmission duration of the normal radio, it is possible to detect an interference wave by utilizing a difference in transmission duration, when a transmission duration of abnormal radio is shorter than the transmission duration of the normal radio.

Examples of the radio system with a constant transmission duration include a radar and a system that transmits data of a predefined length, such as a secondary surveillance radar (SSR), in an aeronautical radio, which is a critical radio. Examples of the radio system with an indefinite transmission duration include a radiotelephone used in air traffic control and in vicinity of an airport facility.

Next, when the transmission duration type is estimated to be indefinite, the transmission duration range estimation unit 116 calculates a minimum transmission duration in the sample data by using a similar method as that in the radio wave abnormality detection system according to the first example embodiment (S114). In the examples in FIGS. 11A to 11C, FIG. 11C corresponds to an example of this case, and a minimum transmit duration is $t_8$. Then, the transmission duration range estimation unit 116 determines an extraction period of feature value, based on the minimum transmission duration. As extraction period of feature value, the minimum transmission duration may be used as it is, or a numerical value close to the minimum transmission duration may be used.

When the transmission duration type is estimated to be constant, the transmission duration range estimation unit 116 calculates a maximum transmission duration in the sample data (S117). FIGS. 11A and 11B correspond to examples of this case, and the transmission duration range estimation unit 116 may acquire the maximum value in these distributions. Specifically, in this case, the transmission duration range estimation unit 116 determines the extraction period, based on the maximum transmission duration estimated from the received data. The maximum transmission duration is a maximum transmission duration in the histogram indicating an occurrence frequency for each transmission duration.

As described above, the radio wave abnormality detection system according to the present example embodiment first classifies a type of a transmission duration of radio observed at general time into two types, which are constant and indefinite. When the transmission duration of the general radio (normal radio) is constant, an extraction period of feature value is set based on a maximum value of the transmission duration, whereby an interference wave can be effectively detected. On the other hand, when the transmission duration of the normal radio is indefinite, by setting an extraction period of feature value based on a minimum transmission duration, it is possible to detect an interference wave without being affected by fluctuation of the transmission duration of the general radio.

As described above with reference to the example embodiments, according to the present disclosure, it is possible to provide a radio wave abnormality detection system, a radio wave abnormality detection method, and a radio wave abnormality detection program capable of accurately detecting an abnormality in a radio wave.

The present disclosure is not limited to the above-described example embodiments, and can be appropriately modified without departing from the scope of the present disclosure. For example, the present disclosure can be applied to applications such as an illegal radio monitoring system and a wireless device failure detection system, but may also be applied to other systems.

Each configuration in the above-described example embodiments is configured of hardware or software, or both, and may be configured of one piece of hardware or software, or may be configured of a plurality of pieces of hardware or software. A function (processes) of each device may be achieved by a computer including a central processing unit (CPU), a field programmable gate array (FPGA), a memory, and the like. For example, a program for performing the method according to the example embodiment may be stored in a storage device, and each function may be achieved by executing the program stored in the storage device by the CPU.

The program includes a group of instructions (or software code) that, when loaded into a computer, causes the computer to perform one or more of the functions described in the example embodiments. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Some or all of the above-described example embodiments may be described as the following supplementary notes, but are not limited thereto.

(Supplementary Note 1)

A radio wave abnormality detection system, including:

a determination unit configured to determine an extraction period, based on a transmission duration estimated from first received data of a radio wave received at a first timing;

a learning unit configured to generate a learned model in which a feature value extracted in the extraction period from second received data of a radio wave received at a second timing is machine-learned; and a detection unit configured to detect a radio wave abnormality by using a feature value extracted in the extraction period from third received data of a radio wave received at a third timing, and the learned model.

(Supplementary Note 2)

The radio wave abnormality detection system according to Supplementary note 1, wherein the determination unit determines the extraction period, based on a minimum transmission duration estimated from the first received data.

(Supplementary Note 3)

The radio wave abnormality detection system according to Supplementary note 2, wherein the minimum transmission duration is a transmission duration smaller than a transmission duration with a maximum occurrence frequency in a histogram indicating an occurrence frequency of each of the transmission durations, and is a maximum transmission duration among transmission durations whose occurrence frequency is smaller than a predetermined occurrence frequency threshold value.

(Supplementary Note 4)

The radio wave abnormality detection system according to Supplementary note 1, wherein the determination unit determines the extraction period, based on a maximum transmission duration estimated from the first received data.

(Supplementary Note 5)

The radio wave abnormality detection system according to Supplementary note 4, wherein the maximum transmission duration is a maximum transmission duration in a histogram indicating an occurrence frequency of each of the transmission durations.

(Supplementary Note 6)

The radio wave abnormality detection system according to Supplementary note 1, wherein the determination unit estimates a type of the transmission duration, and determines the extraction period, based on the estimated type.

(Supplementary Note 7)

The radio wave abnormality detection system according to Supplementary note 6, wherein, when a distribution of the transmission duration and a predetermined function correlate with each other, the determination unit estimates the type of the transmission duration to be constant, and, when a correlation value between the distribution of the transmission duration and the predetermined function is smaller than a preset threshold value, the determination unit estimates the type of the transmission duration to be indefinite.

(Supplementary Note 8)

The radio wave abnormality detection system according to Supplementary note 7, wherein, when the type of the transmission duration is estimated to be constant, the determination unit determines the extraction period, based on a maximum transmission duration, and, when the type of the transmission duration is estimated to be indeterminate, the determination unit determines the extraction period, based on a minimum transmission duration.

(Supplementary Note 9)

The radio wave abnormality detection system according to any one of Supplementary notes 1 to 8, wherein the transmission duration is a duration in which a received power larger than a signal presence/absence determination threshold value is acquired, and the signal presence/absence determination threshold value is a received power whose occurrence frequency is a first minimum point in a histogram indicating an occurrence frequency of each received power, with a received power associated to a noise floor of a receiver receiving a radio wave, as a starting point.

(Supplementary Note 10)

A radio wave abnormality detection method for detecting radio wave abnormality, including:

determining an extraction period, based on a normal transmission duration estimated from first received data of s radio wave received at a first timing;

generating a learned model in which a feature value extracted in the extraction period from second received data of a radio wave received at a second timing; and detecting a radio wave abnormality by using a feature value extracted in the extraction period from third received data of a radio wave received at a third timing, and the learned model.

(Supplementary Note 11)

The radio wave abnormality detection method according to Supplementary note 10, wherein, in the determination, the extraction period is determined based on a minimum transmission duration estimated from the first received data.

(Supplementary Note 12)

A radio wave abnormality detection program for causing a computer to execute processing of:

determining an extraction period, based on a normal transmission duration estimated from first received data of a radio wave received at a first timing;

generating a learned model in which a feature value extracted in the extraction period from second received data of a radio wave received at a second timing is machine-learned; and detecting a radio wave abnormality by using a feature value extracted in the extraction period from third received data of a radio wave received at a third timing, and the learned model.

(Supplementary Note 13)

The radio wave abnormality detection program according to Supplementary note 12, wherein, in the determination, the extraction period is determined based on a minimum transmission duration estimated from the first received data.

The first and second example embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A radio wave abnormality detection system comprising:

at least one memory; and at least one processor being combined with the at least one memory, wherein the at least one processor is configured to:

determine an extraction period, based on a transmission duration estimated from first received data of a radio wave received at a first timing;

generate a learned model in which a feature value extracted in the extraction period from second received data of a radio wave received at a second timing is machine-learned; and detect a radio wave abnormality by using a feature value extracted in the extraction period from third received data of a radio wave received at a third timing, and the learned model.

2. The radio wave abnormality detection system according to claim 1, wherein the at least one processor is configured to determine the extraction period, based on a minimum transmission duration estimated from the first received data.

3. The radio wave abnormality detection system according to claim 2, wherein the minimum transmission duration is a transmission duration smaller than a transmission duration with a maximum occurrence frequency in a histogram indicating an occurrence frequency for each of the transmission durations, and is a maximum transmission duration among transmission durations whose occurrence frequency is smaller than a predetermined occurrence frequency threshold value.

4. The radio wave abnormality detection system according to claim 1, wherein the at least one processor is configured to determine the extraction period, based on a maximum transmission duration estimated from the first received data.

5. The radio wave abnormality detection system according to claim 4, wherein the maximum transmission duration is a maximum transmission duration in a histogram indicating an occurrence frequency of each of the transmission durations.

6. The radio wave abnormality detection system according to claim 1, wherein the at least one processor is configured to estimate a type of the transmission duration and determine the extraction period, based on the estimated type.

7. The radio wave abnormality detection system according to claim 6, wherein the at least one processor is configured to estimate, when a distribution of the transmission duration and a predetermined function correlate with each other, the type of the transmission duration to be constant, and estimate, when a correlation value between the distribution of the transmission duration and the predetermined function is smaller than a preset threshold value, the type of the transmission duration to be indefinite.

8. The radio wave abnormality detection system according to claim 7, wherein the at least one processor is configured to determine, when the type of the transmission duration is estimated to be constant, the extraction period, based on a maximum transmission duration, and determine, when the type of the transmission duration is estimated to be indefinite, the extraction period, based on a minimum transmission duration.

9. The radio wave abnormality detection system according to claim 1, wherein the transmission duration is a duration in which a received power larger than a signal presence/absence determination threshold value is acquired, and the signal presence/absence determination threshold value is a received power whose occurrence frequency is a first minimum point in a histogram indicating an occurrence frequency of each received power, with a received power associated to a noise floor of a receiver receiving a radio wave, as a starting point.

10. A radio wave abnormality detection method comprising:

determining an extraction period, based on a normal transmission duration estimated from first received data of a radio wave received at a first timing;

generating a learned model in which a feature value extracted in the extraction period from second received data of a radio wave received at a second timing; and detecting a radio wave abnormality by using a feature value extracted in the extraction period from third received data of a radio wave received at a third timing, and the learned model.

11. The radio wave abnormality detection method according to claim 10, wherein, in the determination, the extraction period is determined based on a minimum transmission duration estimated from the first received data.

12. A non-transitory computer-readable medium storing a radio wave abnormality detection program for causing a computer to execute processing of:

determining an extraction period, based on a normal transmission duration estimated from first received data of a radio wave received at a first timing;

generating a learned model in which a feature value extracted in the extraction period from second received data of a radio wave received at a second timing; and detecting a radio wave abnormality by using a feature value extracted in the extraction period from third received data of a radio wave received at a third timing, and the learned model.

13. The non-transitory computer-readable medium according to claim 12, wherein, in the determination, the extraction period is determined based on a minimum transmission duration estimated from the first received data.

\* \* \* \* \*